US012712197B2

(12) United States Patent
Choi et al.

(10) Patent No.: US 12,712,197 B2
(45) Date of Patent: Aug. 18, 2026

(54) CYLINDRICAL SECONDARY BATTERY

(71) Applicant: Samsung SDI Co., Ltd., Yongin-si (KR)

(72) Inventors: Woo Hyuk Choi, Yongin-si (KR); Tae Yoon Lee, Yongin-si (KR); Jun Hwan Kwon, Yongin-si (KR); Jun Ho Yang, Yongin-si (KR); Joung Ku Kim, Yongin-si (KR); Hyun Suk Park, Yongin-si (KR); Gwan Hyeon Yu, Yongin-si (KR); Dong Sub Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 672 days.

(21) Appl. No.: 18/152,578

(22) Filed: Jan. 10, 2023

(65) Prior Publication Data

US 2023/0223579 A1 Jul. 13, 2023

(30) Foreign Application Priority Data

Jan. 11, 2022 (KR) ........................ 10-2022-0004074

(51) Int. Cl.
*H01M 10/04* (2006.01)
*H01M 50/107* (2021.01)
(Continued)

(52) U.S. Cl.
CPC ..... *H01M 10/0422* (2013.01); *H01M 50/107* (2021.01); *H01M 50/152* (2021.01);
(Continued)

(58) Field of Classification Search
CPC ........... H01M 10/0422; H01M 50/107; H01M 50/188; H01M 50/147; H01M 50/148;
(Continued)

(56) References Cited

U.S. PATENT DOCUMENTS 8,062,786 B2 11/2011 Kim et al.
9,153,805 B2 10/2015 Lee et al.
(Continued)

FOREIGN PATENT DOCUMENTS

CN 101536210 A 9/2009
CN 101540414 A 9/2009
(Continued)

OTHER PUBLICATIONS

Korean Notice of Allowance for KR Application No. 10-2022-0004074, dated Mar. 27, 2024, 7 pages.
(Continued)

*Primary Examiner* — Basia A Ridley
*Assistant Examiner* — Julia Marie Fehr
(74) *Attorney, Agent, or Firm* — Womble Bond Dickinson (US) LLP

(57) ABSTRACT

A cylindrical secondary battery includes: a cylindrical can having a circular bottom portion, a side portion extending from the bottom portion, a beading part concavely formed inwardly at one end of the side portion, and a crimping part formed by bending a distal end of the side portion; an electrode assembly in the can; and a cap assembly sealing the can. The cap assembly includes a gasket for insulation from the can, and an upper portion of the gasket in a direction away from the electrode assembly has a smaller thickness than a lower portion of the gasket.

7 Claims, 9 Drawing Sheets

(51) Int. Cl.

| | |
|---|---|
| ***H01M 50/152*** | (2021.01) |
| ***H01M 50/167*** | (2021.01) |
| ***H01M 50/184*** | (2021.01) |
| ***H01M 50/188*** | (2021.01) |

(52) U.S. Cl.
CPC ....... *H01M 50/184* (2021.01); *H01M 50/188* (2021.01); *H01M 50/167* (2021.01)

(58) Field of Classification Search
CPC ............. H01M 50/153; H01M 50/183; H01M 50/186; H01M 50/152; H01M 50/184; H01M 50/167
See application file for complete search history.

(56) References Cited

U.S. PATENT DOCUMENTS

| | | | | |
|---|---|---|---|---|
| 9,397,323 | B2 | 7/2016 | Kim | |
| 11,916,207 | B2 | 2/2024 | Jang et al. | |
| 2009/0233157 | A1 | 9/2009 | Kim | |
| 2010/0119935 | A1 | 5/2010 | Kim et al. | |
| 2010/0159310 | A1 | 6/2010 | Kim | |
| 2012/0094169 | A1 | 4/2012 | Kim et al. | |
| 2013/0273401 | A1 | 10/2013 | Lee et al. | |
| 2020/0091469 | A1* | 3/2020 | Sodeyama .......... | H01M 50/152 |
| 2021/0126311 | A1 | 4/2021 | Jang et al. | |
| 2024/0380043 | A1* | 11/2024 | Lee .................... | H01M 50/193 |

FOREIGN PATENT DOCUMENTS

| | | | |
|---|---|---|---|
| JP | H 10-50276 | A | 2/1998 |
| JP | 2000-003698 | A | 1/2000 |
| KR | 2010-0073538 | A | 7/2010 |
| KR | 10-1062685 | B1 | 9/2011 |
| KR | 2012-0038205 | A | 4/2012 |
| KR | 10-1313325 | B1 | 9/2013 |
| KR | 2019-0040800 | A | 4/2019 |
| KR | 2021-0047729 | A | 4/2021 |
| WO | WO 2021/006518 | A1 | 1/2021 |

OTHER PUBLICATIONS

Korean Office action issued in corresponding application No. KR 10-2022-0004074, issued on Feb. 19, 2023, 5 pages.

Extended European Search Report issued in corresponding EP Application No. 23151151.0 dated Jun. 9, 2023, 6 pages.

Chinese Notice of Allowance issued in corresponding CN Application No. 202310033790.2, dated Nov. 13, 2025, 5 pages.

* cited by examiner

CYLINDRICAL SECONDARY BATTERY

CROSS-REFERENCE TO RELATED APPLICATION

This application claims priority to and the benefit of Korean Patent Application No. 10-2022-0004074, filed on Jan. 11, 2022, in the Korean Intellectual Property Office, the entire content of which is incorporated herein by reference.

BACKGROUND

1. Field

Aspects of embodiments of the present disclosure relate to a cylindrical secondary battery.

2. Description of the Related Art

Generally, a cylindrical secondary battery includes a cylindrical electrode assembly, a cylindrical can accommodating the electrode assembly and an electrolyte, and a cap assembly coupled at an upper opening of the can to seal the can and to allow the current generated in (e.g., stored in) the electrode assembly to flow to an external device.

The cap assembly is fixed to the can by forming a crimping part at the top of the can, seating the cap assembly on the crimping part, and forming a beading part to fix the cap assembly. The cap assembly may include a gasket to insulate it from the can. However, when the beading part is formed, the cap assembly may be deformed by being pressed by the pressure applied to the cap assembly, and thus, a cap-up and a safety vent in the cap assembly may be deformed.

The above information disclosed in this Background section is for enhancement of understanding of the background of the present disclosure and, therefore, may contain information that does not constitute prior art.

SUMMARY

Embodiments of the present disclosure provide a cylindrical secondary battery having an improved cap assembly structure to prevent deformation of parts when assembling the cap assembly.

A cylindrical secondary battery, according to an embodiment of the present disclosure, includes: a cylindrical can having a circular bottom portion, a side portion extending from the bottom portion, a beading part concavely formed inwardly at one end of the side portion, and a crimping part formed by bending a distal end of the side portion; an electrode assembly in (e.g., accommodated in) the can; and a cap assembly sealing the can. The cap assembly includes a gasket for insulating the cap assembly from the can, and an upper portion of the gasket in a direction away from the electrode assembly has a smaller thickness than a lower portion thereof.

The gasket may have a shape in which the thickness of the upper portion decreases toward an end portion thereof.

The gasket may have a ring-shaped body, a connection portion extending from the body, and an extension portion extending downwardly from the connection portion, and a thickness of the body may decrease toward an end portion thereof.

The cap assembly may include a cap-up between the crimping part and the beading part, a safety vent below the cap-up, and a cap-down below the safety vent and electrically connected to the electrode assembly. The gasket may insulate the safety vent and the cap-up from the can.

A lower surface of an edge of the safety vent may be in close contact with an upper surface of the cap-up, and the gasket may be bent to surround the edge of the safety vent.

The gasket may have an inclined surface that is chamfered on an inner circumferential surface of the body.

The inclined surface of the gasket may be in close contact with an upper surface of an edge of the safety vent.

The safety vent may be bent to extend over the upper surface of the cap-up, and a bending position at where the safety vent is bent may be at where to the inclined surface of the gasket begins.

BRIEF DESCRIPTION OF DRAWINGS

The above and other aspects and features of the present disclosure will become more apparent by describing, in detail, embodiments thereof with reference to the attached drawings, in which.

DETAILED DESCRIPTION

Figure 1:
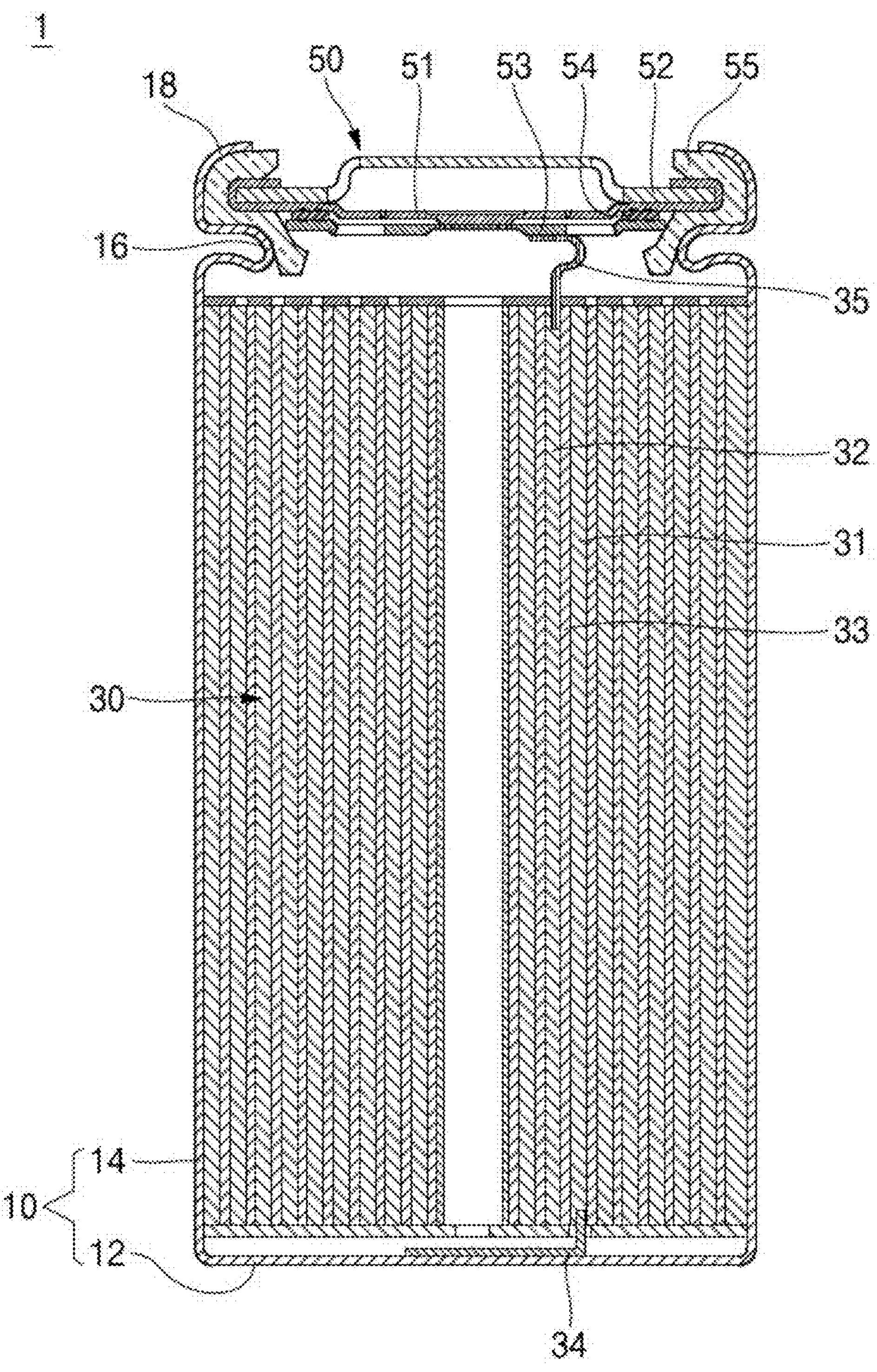
FIG. 1 is a longitudinal cross-sectional view of a comparative cylindrical secondary battery.

Embodiments of the present disclosure are described below to more completely explain the aspects and features of the present disclosure to those skilled in the art. The following embodiments may be modified in various different forms. Further, the present disclosure may be embodied in many different forms and should not be construed as being limited to the embodiments set forth herein. Rather, these embodiments are provided so that this disclosure will be thorough and complete and will convey the aspects and features of the present disclosure to those skilled in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on,"

"directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Hereinafter, a general cylindrical secondary battery will be briefly described with reference to the accompanying drawings.

FIG. 1 is a longitudinal cross-sectional view of a general cylindrical secondary battery.

As shown in FIG. 1, a cylindrical secondary battery 1 includes a cylindrical can 10 having an open end in the longitudinal direction, an electrode assembly 30 accommodated in the can 10, and a cap assembly 50 that seals the can 10.

The can 10 has a circular bottom portion 12 and a side portion 14 extending upwardly from the bottom portion 12, and the top portion (e.g., the top end) of the side portion 14 is open. In the manufacturing process of the secondary battery 1, the electrode assembly 30 is accommodated in the can 10 together with an electrolyte through the opening of the can 10. The can 10 may be made of steel, a steel alloy, nickel-plated steel, a nickel-plated steel alloy, aluminum, an aluminum alloy, or an equivalent thereof.

A beading part (e.g., a bead) 16 and a crimping part (e.g., a crimp or crimped end) 18 are formed on the side portion 14 to fix the cap assembly 50. The beading part 16 is formed by bending (or pressing) the side portion 14 concavely toward the inside of the can 10. The cap assembly 50 is seated on the beading part 16 when assembling the cap assembly 50. The crimping part 18 is formed by bending the end of the side portion 14 (e.g., the distal end of the side portion 14 or the end of the side portion 14 opposite to the bottom portion 12) toward the inside of the can 10 after the cap assembly 50 is seated on the beading part 16 in the can 10. The crimping part 18 prevents the cap assembly 50 from being separated from the can 10. The beading part 16 is spaced apart from, so as not to contact, the electrode assembly 30.

The electrode assembly 30 includes a negative electrode plate 31 coated with a negative electrode active material (e.g., graphite, carbon, etc.), a positive electrode plate 32 coated with a positive electrode active material (e.g., a transition metal oxide, such as $LiCoO_2$, $LiNiO_2$, $LiMn_2O_4$, etc.), and a separator 33 interposed between the negative electrode plate 31 and the positive electrode plate 32 to prevent a short circuit between the negative electrode plate 31 and the positive electrode plate 32. The negative electrode plate 31 may be a copper (Cu) or nickel (Ni) foil, the positive electrode plate 32 may be an aluminum (Al) foil, and the separator 33 may be polyethylene (PE) or polypropylene (PP). A negative electrode tab 34 is welded to the negative electrode plate 31 to downwardly protrude a certain length therefrom, and a positive electrode tab 35 is welded to the positive electrode plate 32 to upwardly protruding a certain length therefrom. The negative electrode tab 34 is welded to the bottom portion 12 of the can 10, and the positive electrode tab 35 is welded to the cap assembly 50. Therefore, the can 10 acts as a negative electrode, and the cap assembly 50 acts as a positive electrode. The negative electrode plate 31, the positive electrode plate 32, and the separator 33 are wound in a cylindrical shape and accommodated inside the can 10.

The cap assembly 50 includes a safety vent 51, a cap-up 52 disposed above the safety vent 51, and a cap-down 53 disposed below the safety vent 51. The cap assembly 50 further includes an insulating member 54 inserted (or arranged) between the safety vent 51 and the cap-down 53 for insulation and to prevent portions other than the central portion of the safety vent 51 from contacting the cap-down 53, and a gasket 55 for insulating the cap assembly 50 and the can 10 from each other. The central portion of the safety vent 51 is in contact with the cap-down 53, and the portion of the safety vent 51 supported by the insulating member 54 is spaced apart from the cap-down 53 (e.g., is spaced apart from the cap-down 53 by the insulating member 54). The safety vent 51 has a notch 51*a* formed therein to facilitate (e.g., to control) bursting to discharge gas when the internal pressure in the can 10 rises above a reference level.

Figure 2A:
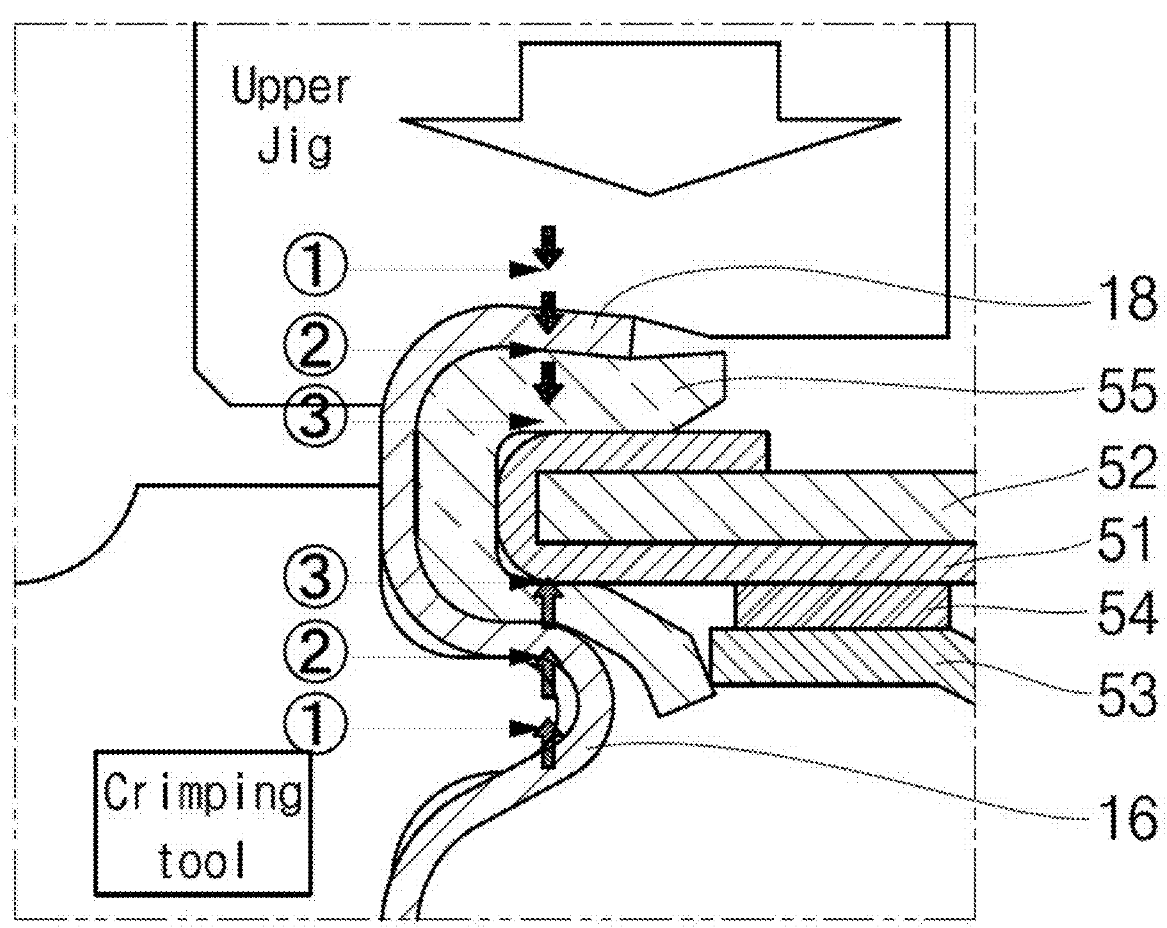
FIG. 2A is a cross-sectional view of a part of the comparative cylindrical secondary battery shown in FIG. 1 describing a direction of pressure applied when assembling a cap assembly.
Figure 2B:
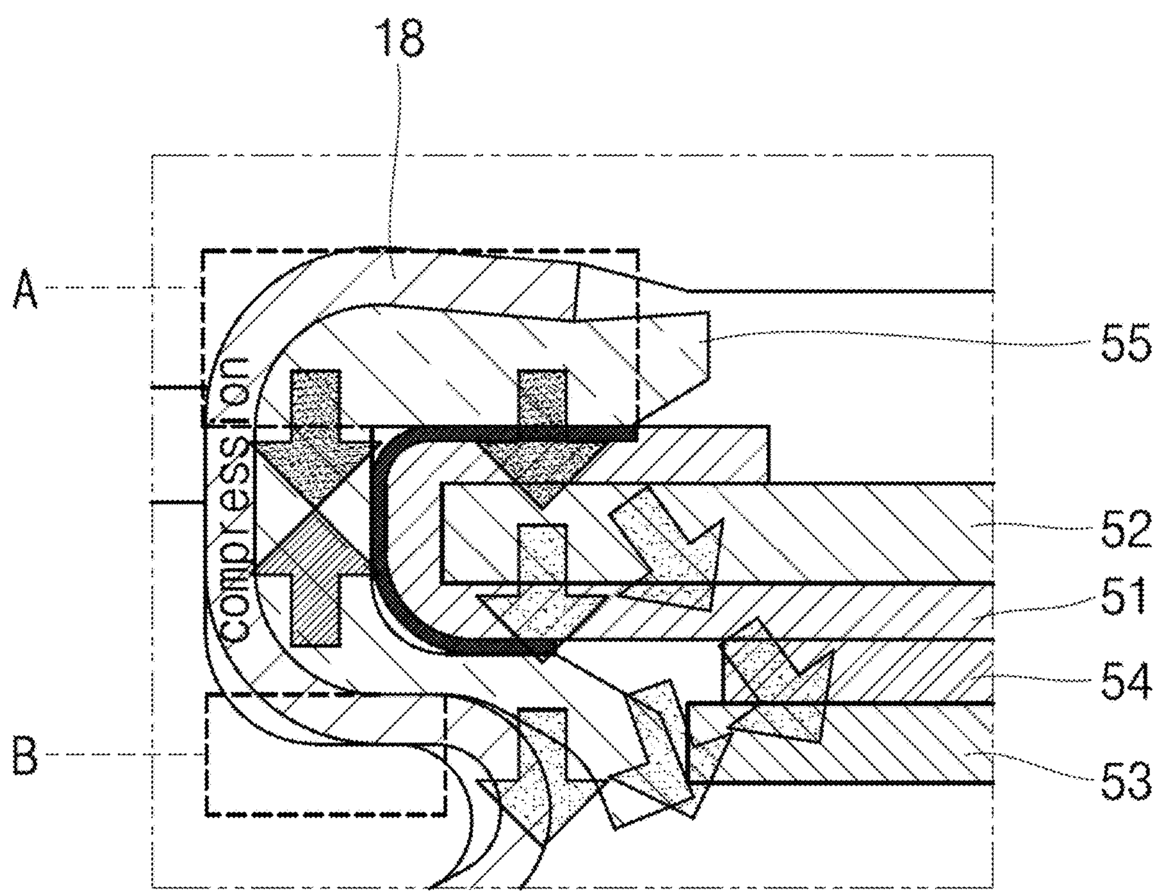
FIG. 2B is a cross-sectional view of a part of the cylindrical secondary battery shown in FIG. 2A describing pressure distribution in the comparative cylindrical secondary battery shown in FIG. 1.
Figure 3:
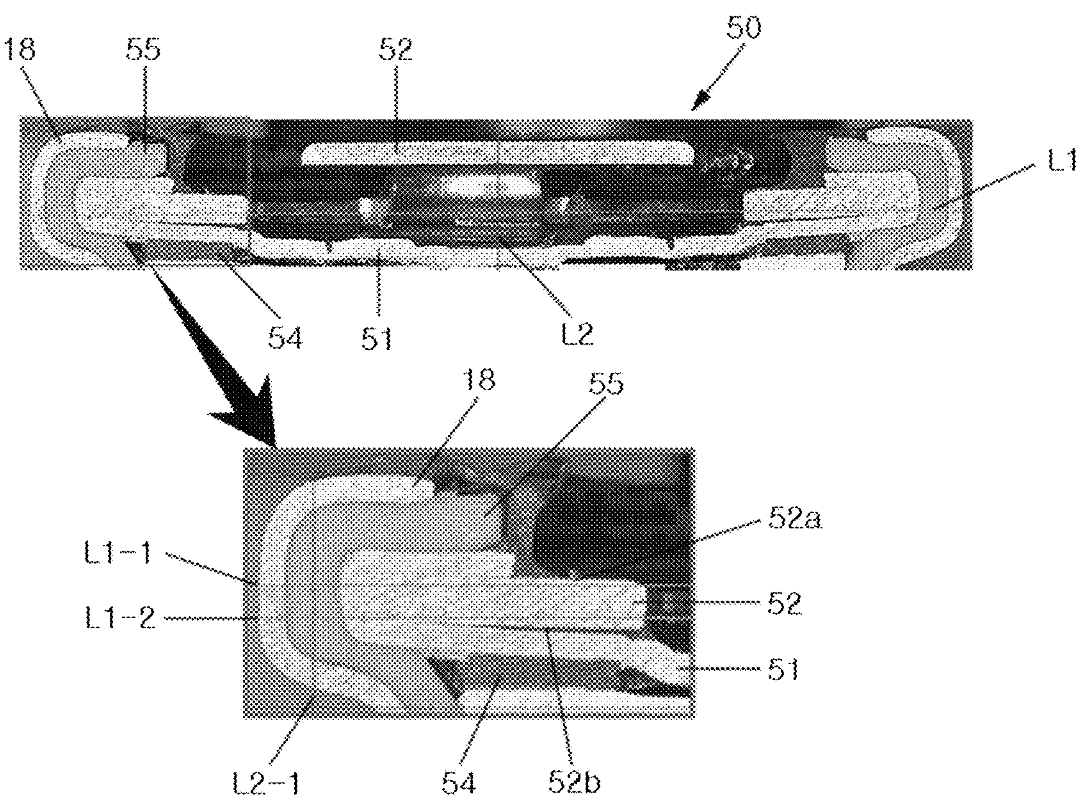
FIG. 3 is a CT image showing deformation of the cap assembly after assembling the cap assembly according to FIG. 1.
Figure 4:
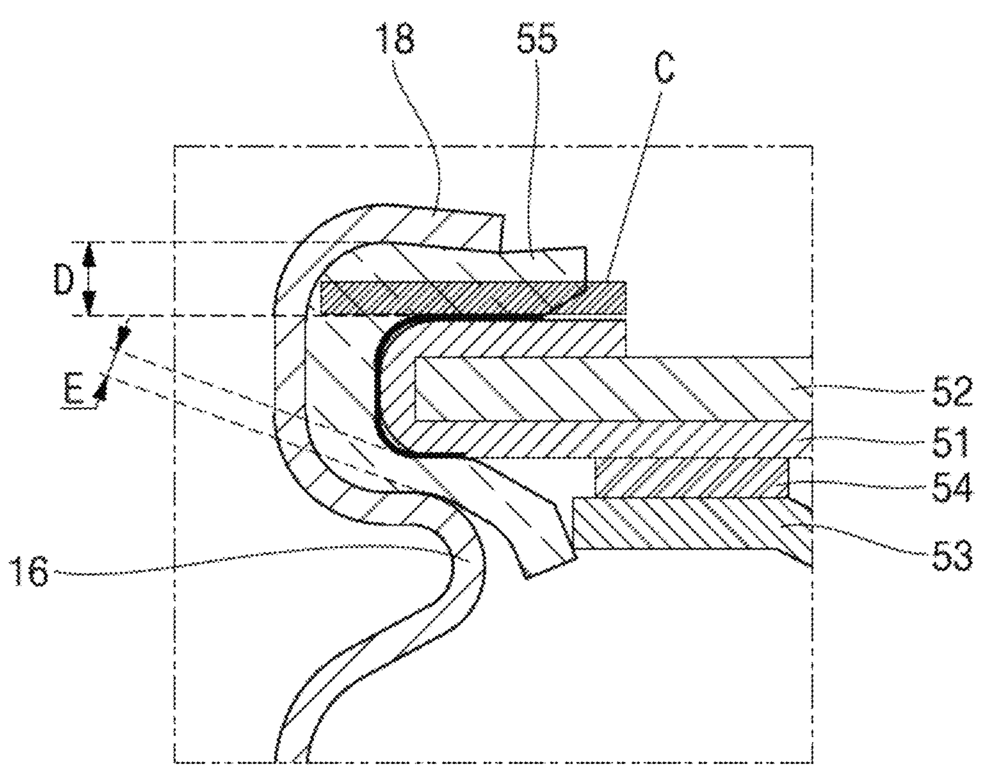
FIG. 4 is a cross-sectional view of a part of the comparative cylindrical secondary battery describing compression areas of the cap assembly.

FIG. 2A is a cross-sectional view of a part of the cylindrical secondary battery 1 shown in FIG. 1 describing direction of pressure applied when assembling the cap assembly 50. FIG. 2B is the same cross-sectional view as FIG. 2A but describes the pressure distribution. FIG. 3 is a computerized tomography (CT) image showing deformation of the cap assembly 50 after assembly. FIG. 4 is the same cross-sectional view as FIGS. 2A and 2B but describes compression areas of the cap assembly 50 according to gasket positions.

As shown in FIG. 2A, to form the beading part 16, the side portion 14 of the can 10 is pressed with a side portion jig such that pressure is applied to the gasket 55 from the beading part 16 in the order of arrows ①, ②, and ③. In addition, to form the crimping part 18, the top end of the side portion 14 is pressed with an upper jig such that pressure is applied to the gasket 55 from the crimping part 18 in the order of ①, ②, and ③.

Region A of FIG. 2B is a region where load is generated by the pressure applied from the top (e.g., above) the can 10, and region B is a region where stress is generated by the pressure applied from the bottom (e.g., from below). Therefore, the gasket 55 is compressed due to the pressure applied in the vertical direction. In addition, the pressure transmitted to (e.g., applied to) the gasket 55 compresses the gasket 55 and is transmitted to the cap-down 53 via the safety vent 51, the cap-up 52, and the insulating member 54 in the direction of the arrows in FIG. 2B. This transmitted force deforms the safety vent 51 and the cap-up 52 in the downward direction.

Referring to FIG. 3, in the CT image of the cap assembly 50, it can be seen that the upper and lower surfaces 52*a* and 52*b* of the cap-up 52 are not parallel to guide lines (or reference lines) L1-1 and L1-2 that are parallel to a horizontal center line L1, but instead, the upper and lower surfaces 52*a* and 52*b* of the cap-up 52 sag in the downward direction. In other words, the cap-up 52 is deformed in the downward direction. Due to the deformation of the cap-up 52, the safety vent 51 also receives a load and is deformed in the downward direction. In FIG. 3, the vertical guide lines (or reference lines) L2 and L2-1 are guide lines showing that guide lines L1, L1-1, and L1-2 are perpendicular to the vertical guide lines L2 and L2-1.

Referring to FIG. 4, when region D, which is the upper region of the gasket 55, is compressed by about 7%, compared to its pre-deformation (or pre-assembly) state, region E, which is the lower region of the gasket 55, is compressed about 54% compared to its pre-deformation state. In other words, the lower region, region E, may receive a relatively large amount of pressure because there the contact area between the gasket 55 and the safety vent 51 (e.g., the relatively thick line in FIG. 4 indicates a contact part or contact area) is relatively large while the gasket 55 has a relatively small contact area with other components such that it may receive a greater load. Therefore, part deformation (e.g., denting) occurs in (or toward) the small contact area, and the parts may sag. When the cap assembly 50 is deformed, the stability and reliability of the secondary battery 1 may deteriorate.

According to embodiments of the present disclosure, however, a gasket 500 which has a different shape at an upper region thereof compared to a shape of the upper region of the gasket 55. The gasket 500 is described below with reference to FIGS. 5-8, and detailed descriptions of the same structures as those described above with reference to FIGS. 1 to 4 will be omitted to avoid redundant descriptions.

Figure 5:
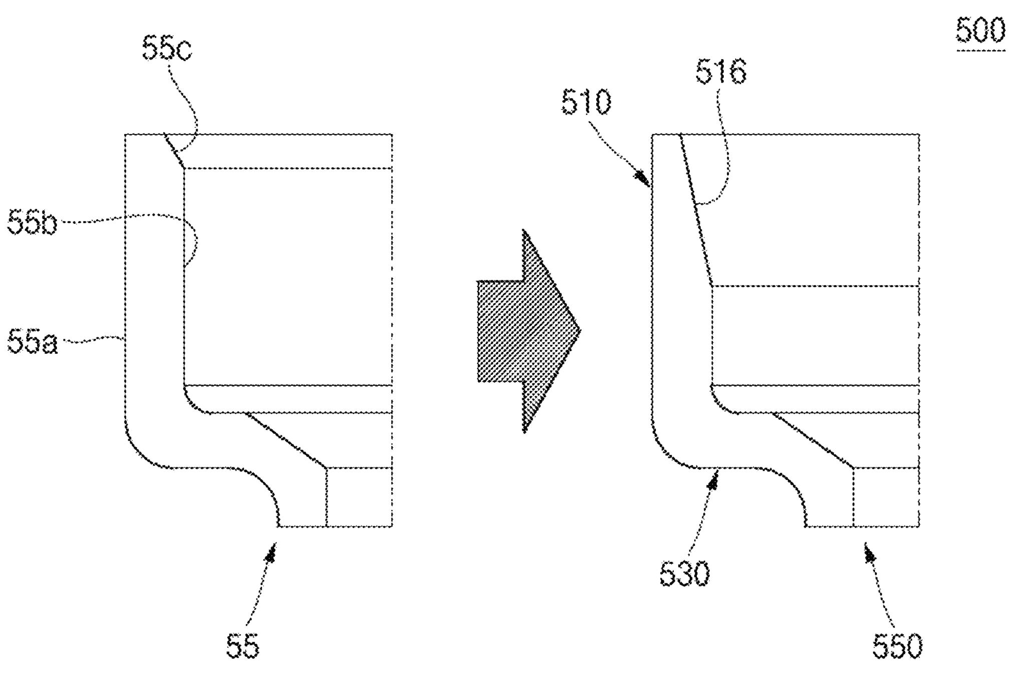
FIG. 5 is a perspective view comparing a gasket according to the comparative example shown in FIGS. 1 to 4 and a gasket according to an embodiment of the present disclosure.
Figure 6:
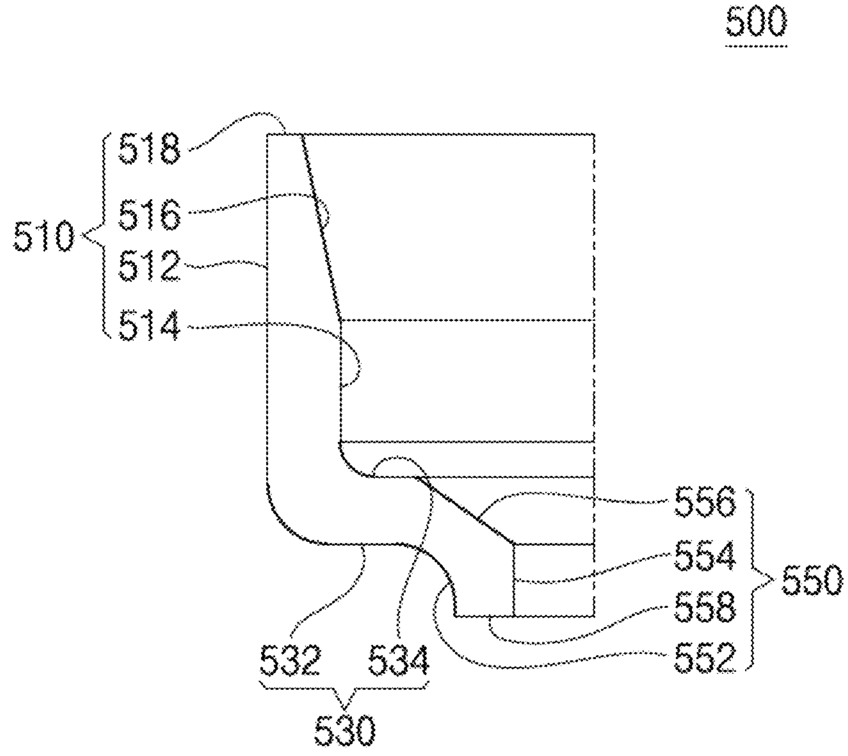
FIG. 6 is a perspective view of a gasket according to an embodiment of the present disclosure.

FIG. 5 is a partial perspective view for comparing a gasket according to FIGS. 1 to 4 and a gasket according to an embodiment of the present disclosure. FIG. 6 is a partial perspective view showing a detailed structure of a gasket according to an embodiment of the present disclosure.

As shown in FIGS. 1 and 5, the gasket 55 has a substantially ring shape to surround (e.g., to extend around) and support the edges of the safety vent 51 and the cap-up 52. The gasket 55 has an outer circumferential surface 55*a* and an inner circumferential surface 55*b*, and an upper surface of the inner circumferential surface 55*b* is partially chamfered to have a short inclined surface 55*c*. The gasket 500 according to an embodiment of the present disclosure has a shape chamfered to have a long inclined surface 516 compared to the short inclined surface 55*c* of the inner circumferential surface 55*b* of the gasket 55.

As shown in FIG. 6, the gasket 500, according to an embodiment of the present disclosure, has a substantially ring shape and includes a body 510 having a length in the vertical direction, an extension portion 550 that extends approximately vertically downward, and a connection portion 530 that is bent substantially vertically from the body 510 and extends between and connects the body 510 and the extension portion 550. The expression "substantially vertical" means that the angles between the body 510 and the connection portion 530 and between the connection portion 530 and the extension portion 550 are vertical but are not limited to strictly vertical.

The body 510 may have an outer circumferential surface 512 that is flat in the vertical direction, an inner circumferential surface 514, an inclined surface 516 inside the outer circumferential surface 512, and an upper surface 518 connecting (e.g., extending between) the outer circumferential surface 512 and the inclined surface 516. The outer circumferential surface 512 contacts the side portion 14 of the can 10, similar to the gasket 55 shown in FIG. 1. The inner circumferential surface 514 is a portion in close contact with the edges of the safety vent (see, e.g., 51' in FIG. 8) and the cap-up (see, e.g., 52' in FIG. 8) and corresponds to (e.g., is opposite to) the lower part of the outer circumferential surface 512 that is roughly bisected in the vertical direction. When the gasket 500 is bent, only a portion of the inner circumferential surface 514 is bent to come into contact with the upper portion of the safety vent 51'. The inclined surface 516 corresponds to (e.g., is opposite to) the upper part of the outer circumferential surface 512 that is roughly bisected in the vertical direction. The inclined surface 516 is a surface formed in an inclined shape by chamfering the part that was previously the inner circumferential surface (e.g., by chamfering the upper portion of the inner circumferential surface 514). The inclined surface 516 has a shape in which the distance (e.g., the thickness of body) from the outer circumferential surface 512 decreases toward the upper end. For example, the thickness of the upper part of the gasket 500 in the direction away from the electrode assembly 30 is smaller than the thickness of the lower part (e.g., a portion where the connection portion 530 and the extension portion 550 are located). In addition, the gasket 500 has an upper thickness that decreases toward the top end thereof.

The connection portion 530 is a portion of the gasket 500 that is bent substantially vertically from the body 510 to have a length in the horizontal direction. The connection portion 530 has an outer surface 532 and an inner surface 534, and the distance between the outer surface 532 and the inner surface 534 (e.g., the thickness of the connection portion 530) may be equal to or similar to the distance between the outer circumferential surface 512 and the inner circumferential surface 514 of the body 510.

The extension portion 550 is a portion that is bent substantially vertically at an end of the connection portion 530 and extends downward to have a length. The extension portion 550 has an outer circumferential surface 552 and an inner circumferential surface 554, an inclined connection surface 556 extending between the inner surface 534 of the connection portion 530 and the inner circumferential surface 554, and a lower surface 558 connecting (e.g., extending between) the outer circumferential surface 552 and the inner circumferential surface 554.

The body 510, the connection portion 530, and the extension portion 550 have been separately described above, but this is only for ease of understanding. The body 510, the connection portion 530, and the extension portion 550 may be integrally formed, and the gasket 500 has a ring shape connected as a whole.

Figure 7:
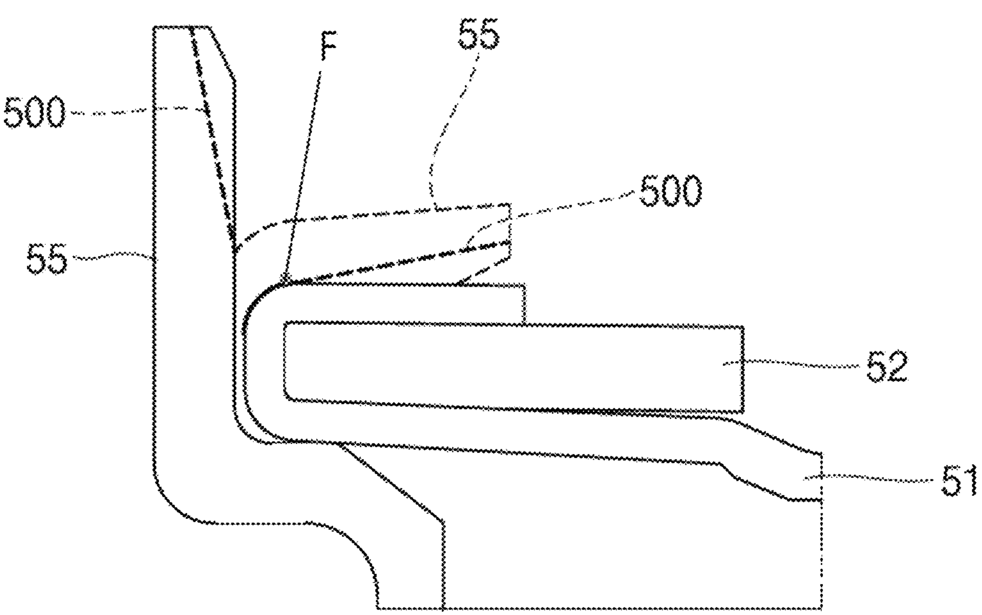
FIG. 7 is a view comparing bending states of the comparative gasket described with respect to FIGS. 1 to 4 and the gasket described with respect to FIGS. 5 and 6 according to an embodiment of the present disclosure.

FIG. 7 is a view comparing bending states of the comparative gasket described with respect to FIGS. 1 to 4 and the gasket described with respect to FIG. 6 according to an embodiment of the present disclosure.

As shown in FIG. 7, different the comparative gasket 55, the gasket 500 according to an embodiment of the present embodiment has an inclined surface from where the chamfering starts at a bending position F to the top end thereof. Here, the bending position F is a position at where, when the gasket 500 forms a beading part (see, e.g., FIG. 2) to surround the edges of the safety vent 51 and the cap-up 52, the gasket 500 is bent to start to contact the upper surface of the safety vent 51. That is, the bending position F is a point at where a flat straight section starts at the part where the safety vent 51 is bent. The inclined surface 516 is formed by chamfering from this part to the end surface to reduce or minimize the transmission of pressure that is downwardly applied to the gasket 500 to other parts by reducing the contact area between the upper part of the gasket 500 and the safety vent 51 compared with the relatively large contact area between the gasket 55 and the safety vent 51 as described in FIG. 4.

As described above, by forming a relatively longer inclined surface 516 than in the comparative gasket 55, the gasket 500 may experience less compression and deformation during can processing by reducing the upper thickness of the gasket 500 (e.g., the thickness of the body 510 over the safety vent 51). Accordingly, deformation of parts of the cap assembly may be reduced or prevented.

Figure 8:
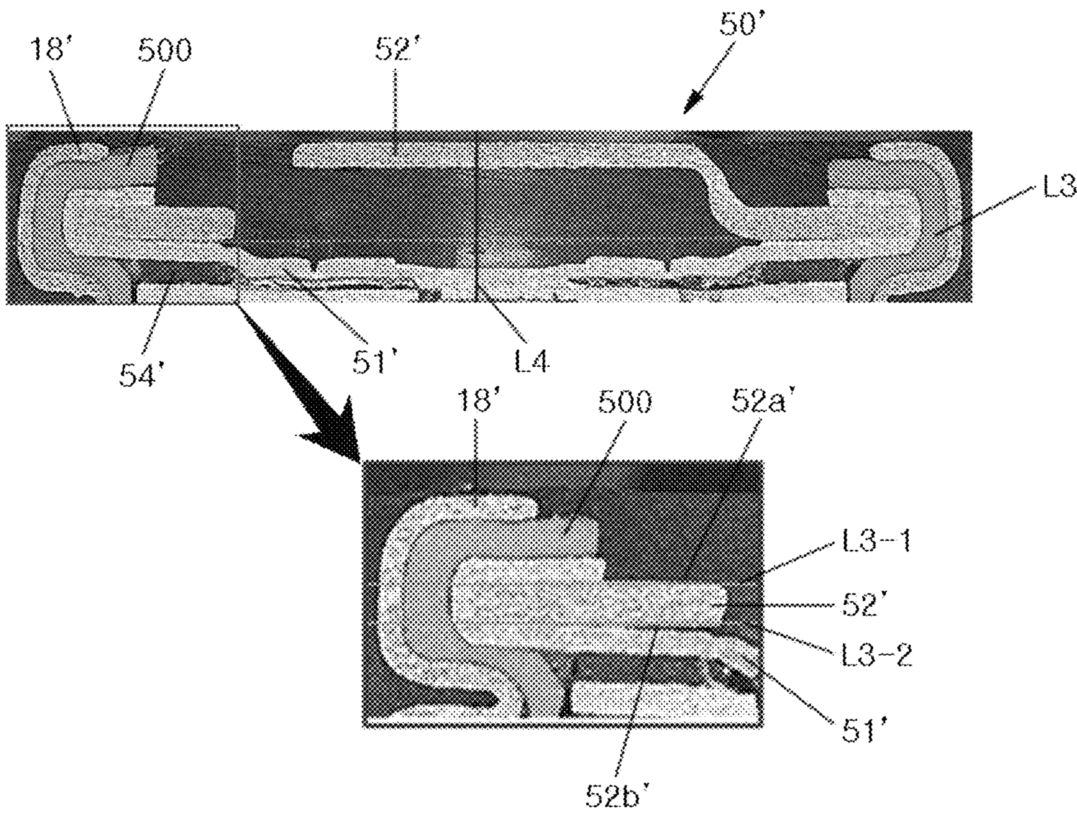
FIG. 8 is a CT image showing a cap assembly according to an embodiment of the present disclosure after assembly.

FIG. 8 is a CT image showing a state after assembling a cap assembly according to an embodiment of the present disclosure.

Referring to FIG. 8, the CT image of a cap assembly 50', which is similar to the cap assembly 50 described above but includes the gasket 500 in place of the gasket 55, it can be seen that an upper surface 52*a*' and a lower surface 52*b*' of a cap-up 52' are parallel to guide lines (or reference lines) L3-1 and L3-2 that are parallel to a horizontal center line L3. In other words, even after the formation of a beading part 18', the cap-up 52' is not deformed in the downward direction. Because the cap-up 52' is not deformed, the safety vent 51' is not deformed, and other parts of the cap assembly 50' are not deformed. In FIG. 8, the vertical guide line (or reference line) L4 is a guide line showing that guide lines L3, L3-1, and L3-2 are perpendicular to the vertical guide line.

As described above, according to embodiments of the present disclosure, by improving the shape of a gasket, parts, such as a cap-up, a safety vent, etc., are not deformed by pressure when forming a crimping part and a beading part in a can for assembling of a cap assembly. Accordingly, the stability of the secondary battery may be improved.

According to embodiments of the present disclosure, by improving the shape of a gasket, parts of a cap assembly, such as a cap-up, a safety vent, etc., may not be deformed by pressure when forming a crimping part and a beading part in a can for assembling of the cap assembly, thereby improving the stability of secondary battery.

While the foregoing embodiments are only some of the embodiments for carrying out the present disclosure, which is not limited to the embodiment, it will be understood by a person skilled in the art that various changes in form and details may be made therein without departing from the spirit and scope of the present disclosure as defined by the following claims and their equivalents.

What is claimed is:

1. A cylindrical secondary battery comprising:

a cylindrical can having a circular bottom portion, a side portion extending from the bottom portion, a beading part concavely formed inwardly at one end of the side portion, and a crimping part formed by bending a distal end of the side portion;

an electrode assembly in the can; and a cap assembly sealing the can, the cap assembly comprising:

a gasket for insulation from the can, an upper portion of the gasket in a direction away from the electrode assembly having a smaller thickness than a lower portion of the gasket;

a cap-up between the crimping part and the beading part; and a safety vent below the cap-up, wherein the gasket has an inclined surface that is chamfered on an inner circumferential surface thereof, the inclined surface beginning at an edge of the cap-up, and wherein a lower surface of an edge of the safety vent is in contact with an upper surface of the cap-up.

2. The cylindrical secondary battery of claim 1, wherein the thickness of the upper portion of the gasket decreases toward its end portion.

3. The cylindrical secondary battery of claim 2, wherein the gasket has a ring-shaped body, a connection portion extending from the body, and an extension portion extending downwardly from the connection portion, and wherein a thickness of the body decreases toward its end portion.

4. The cylindrical secondary battery of claim 3, wherein the cap assembly further comprises a cap-down below the safety vent and electrically connected to the electrode assembly, and wherein the gasket insulates the safety vent and the cap-up from the can.

5. The cylindrical secondary battery of claim 4, wherein the gasket is bent to surround the edge of the safety vent.

6. The cylindrical secondary battery of claim 5, wherein the inclined surface of the gasket is in contact with an upper surface of the edge of the safety vent.

7. The cylindrical secondary battery of claim 6, wherein the safety vent is bent to extend over the upper surface of the cap-up, and wherein a bending position at where the safety vent is bent is at where the inclined surface of the gasket begins.

* * * * *